M. B. CHURCH.
AUTOMOBILE FOR COLLECTING AND DISTRIBUTING.
APPLICATION FILED MAR. 14, 1914.

1,210,762.

Patented Jan. 2, 1917.

Attest:
E. M. Hamilton.
Ewd L. Tolson.

Inventor:
Melvin B. Church.
by Spear, Middleton, Donaldson & Spear
Attys.

UNITED STATES PATENT OFFICE.

MELVIN B. CHURCH, OF GRAND RAPIDS, MICHIGAN.

AUTOMOBILE FOR COLLECTING AND DISTRIBUTING.

1,210,762.    Specification of Letters Patent.    Patented Jan. 2, 1917.

Application filed March 14, 1914. Serial No. 824,770.

*To all whom it may concern:*

Be it known that I, MELVIN B. CHURCH, citizen of the United States, residing at Grand Rapids, Michigan, have invented certain new and useful Improvements in Automobiles for Collecting and Distributing, of which the following is a specification.

My invention comprises a peddling automobile, that is one which can be used to advantage for house to house deliveries, mail collections and the like, by one man who does the driving and the foot work. This, so far as I am aware, has never been attempted before, that is providing an automobile having means particularly devised and arranged for this purpose; it having been necessary previous to my invention to send an operator and a foot-man to do such work together.

One type of vehicle to which I apply my invention provides a very practicable dust cart with which to collect the accumulated piles of sweepings as usually left at the side of the street, or the garbage at every house. Without this present invention added to an automobile designed for such work, two men have been required, the one doing the work on foot and the other occupying the seat, or if one does the work he must climb into the automobile after each stop, taking the usual position on the seat in order to operate the controller and clutches and to manipulate the steering means. With my invention herein-described the operator can stand on a side step at any convenient point, as on the side or at the front or rear of the machine and control the electric power for the steering and propelling front wheel or wheels from any position on the vehicle which may be preferred.

Figure 1:
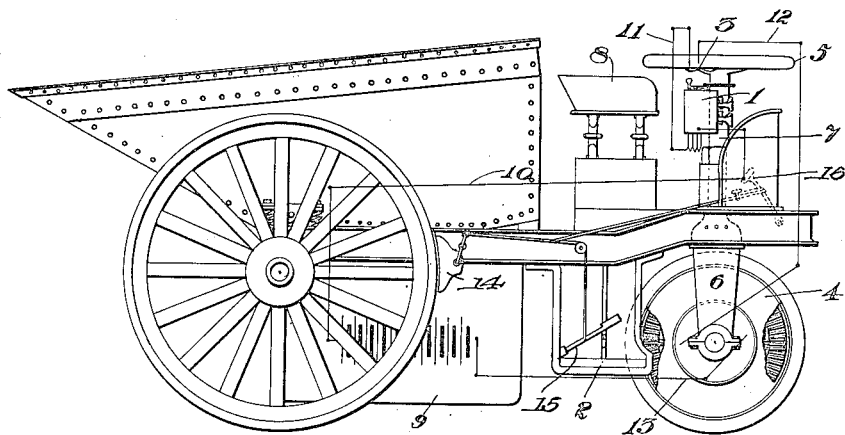

In the drawings: Figure 1 is a side view, and Fig. 2 a front view of a vehicle embodying my invention.

By using my invention in the single traction wheel form, the wheel can be readily deflected to any degree desired, in fact it may be turned so far around to the right or left that the forward propelling motion will propel the vehicle backward by deflecting the wheel all the way around within its supporting fork.

The invention consists in the features and combination and arrangement of parts hereinafter described and particularly pointed out in the claims.

Figure 2:
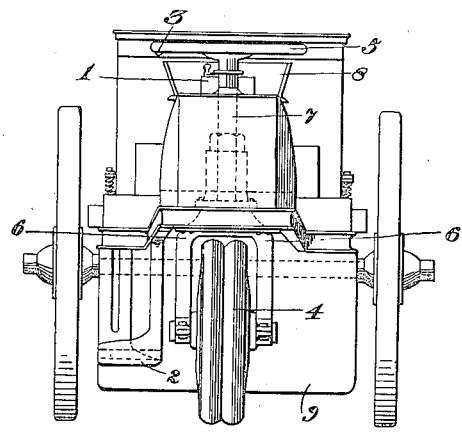

In the accompanying drawings the electric controller is indicated at 1 in Figs. 1 and 2. This is arranged with a handle for convenient manipulation from the seat and may be placed so as to be reached without difficulty from the side step at 2, on which the operator may stand and reach the switch readily to change the controller occasionally when the road may require more or less power to propel the vehicle. The step is preferably arranged at the right hand side of the vehicle and near its front and may be in the form of a running board.

In addition to the controller I provide a switch, as explained, at 3, between the controller and the motor driving the wheel 4 or wheels, as a supplemental stopping means adjacent to the standing or side position of the operator. The switch is closed when the vehicle is running and the vehicle may be stopped or started by opening or closing the switch for slow moving from house to house; the controller being set for slow speed adapted to such slow moving and to provide an amount of current adapted for the road conditions at the time.

In Figs. 1 and 2 I show the switch located on or in the rim of the steering wheel 5. Instead of a switch a contact plug may be employed or a removable plug to operate the switch so that when the driver leaves the vehicle to make a call he can take the plug with him and thus prevent unauthorized persons from moving the vehicle.

Briefly stated, the invention includes a switch system so provided between the controller and the wheel motor to enable the operator to drive the vehicle from a side position without necessity of occupying the seat or usual position back of the operating devices.

The circuit connections being ordinary they will be clear from an inspection of the drawings but may be briefly stated as follows: From a battery 9 a wire 10 leads to the controller 1 which connects through the switch 3 with the motor in or attached to the wheel. The circuit is from battery 9 through the wire 10 to controller 1, through wire 11 to switch 3 and through wire 12 to motor and through wire 13 back to the battery. When the controller is set and the switch opened at 3 the circuit is broken. The switch also serves as a safety means for cutting off the current in emergencies.

Fig. 2 is a front view showing the position of the traction wheel 4 and the hand wheel 5 directly over the traction wheel for steering and a front view of the side step, or running board 2. A pair of rear wheels for carrying load, preferably on steel tires, and high wheels, as shown, constitute the three-wheel type. The front traction wheel is mounted in a fork 6 having a steering post 7 suitably mounted, preferably with ball bearings, in the frame of the vehicle. This fork and post are preferably inclined upwardly slightly toward the rear, and the fork and stem are preferably straight.

Directly on the steering post is the hand wheel 5. This is preferably of approximately the same diameter as the traction wheel when used in this type for heavy trucking. The traction wheel 4 shown in Figs. 1 and 2 has an electric motor within it and preferably the motor and the transmission mechanism within the wheel are like that disclosed in Patent #856,943 to Church and Knudsen and is known as the balanced couple-gear. Current is supplied to the motor from the battery. A front seat for the driver is located at 8. Seated here he can grip the wheel of the steering gear with both hands and exercise proper control upon the steering post by direct action thereon without the interposition of gearing of any kind between the steering wheel and the steered power wheel. By this means the operator always has the leverage parallel and straight in front of him, no matter in what position or degree of angle the steered wheel may be deflected, and can regulate it by grasping the rim near to or farther from him to obtain greater or less purchase as may be required where more or less load is over the wheels or as the ground is soft or hard making the steering more or less difficult. With this means and with the controller at hand to conveniently advance or cut down the current simultaneously with and in proportion to the degree of deflection of the steered wheel, this steering by direct application to the steered power wheel by the driver can be accomplished readily, as I have found in practice where the steered wheel and the load carried directly over it amounts to more than a ton in weight.

When the electric vehicle has four wheels I use this switching control system in such slow moving, as described, from house to house. I then have two front wheels to be driven by an electric motor within or connected to them and mounted in the ordinary way for steering. I may provide an extra controller adjacent to a side position, step or running board instead of the switch for some kinds of work, as for very uneven road surface which may require very frequent changing of strength of current, for such house to house stopping, in slowly moving along in such work, without occupying the usual position taken by operators in driving automobiles in regular uses. And for this use of controller, I may use a shiftable controller, providing one, as with an automatic electric terminal connection for its wires, with corresponding part at each side position so that substantially the same result may be obtained, with some added expense, that I obtain in my system including a switch between the controller and motor as explained herein as one of the principal elements of this invention. I do not include with this application claims for the duplicate, or shiftable controller system suggested above. I also arrange brake mechanism which is accessible either from the usual seat or from the side step, and while this side step may be arranged in various positions and the brake mechanism may be of various forms in the particular form illustrated, this comprises brake shoes as 14 with connections to a foot lever 15 at the step and a foot lever 16 within reach of the driver when on the usual seat.

In the foregoing specification I have only mentioned battery power. To use what is known as the gas-electric means for driving automobiles, it is only necessary to run the wire connections from the generator which, in such system, is usually on an engine shaft, to the controller and through the switch, as described herein; the circuit being operated in the same manner as I have described for the battery.

I claim as my invention:

1. In a peddling automobile, the combination of a front-motor traction and steered wheel, the usual seat, a battery or generator having circuit connection to the front wheel motor, a step or rest for the driver at a side of the vehicle, a controller and switch means between the controller and front wheel motor for driving the vehicle at different speeds or for stopping the vehicle, steering means, said switch and steering means being within reach of the driver from said step or rest.

2. In a peddling automobile, the combination of a front motor traction and steered wheel, the usual seat, a battery or generator, circuit connections to the front wheel drive, a step or rest for the driver at a side of the vehicle, steering means, brake means, means for controlling the circuit to the front traction wheel, said steering means, brake means, and circuit controlling means being so arranged as to be accessible from the usual seat and from the side step or rest.

3. In combination in a motor vehicle, a front self propelling wheel carrying a motor within it, a swivel fork in which said propelling wheel is mounted, a steering post extending up directly from the fork and axially of the swivel mounting of said wheel, and steering means consisting of a hand wheel mounted directly on and coaxially with the post and moving through angles corresponding to the different angular positions of the self propelling wheel in steering, substantially as described.

4. In combination in a motor vehicle, a front propelling wheel carrying an electric motor, a swiveled fork for said wheel, a steering post extending up directly from the fork and axially of the swivel mounting of said wheel, steering means consisting of a wheel mounted directly on the post, and an electric controller to control the current to said driving and steering wheel for fast or slow speed to accord with the rate of deflection in steering, substantially as described.

5. In combination in a motor vehicle, a front propelling wheel carrying a motor, a swiveled fork in which said wheel is mounted, a steering post extending up directly from the fork and axially of the swivel mounting of the fork, steering means consisting of a hand wheel mounted directly on the post, an electric controller arranged adjacent the steering wheel to control the current for fast or slow speed, and a side front step from which the operator may manipulate the steering wheel and controller, substantially as described.

6. In combination in a motor vehicle, a front propelling wheel carrying a motor, a swiveled fork in which said wheel is mounted, a steering post extending up directly from the fork and axially of the swivel mounting, a steering wheel directly on the post, an electric controller for regulating the speed, and a switch in the rim of the steering wheel for slowly propelling the vehicle on one circuit predetermined by the controller, substantially as described.

7. A peddling automobile having in combination a single front selfpropelling wheel carrying a motor within it, with a steering post and a steering wheel mounted directly on and coaxially with said post, a seat in rear of said steering wheel, controlling means for the motor, a side platform or rest, said steering wheel and controlling means being operatively within reach of the driver from said seat or from said side platform or rest, and brake means having two members for operating the same, one of said members being operatively within reach of the driver from the seat and the other member being operatively within reach of the driver on the side platform or rest, substantially as described.

8. In a peddling automobile, the combination of a motor mounted thereon, a controller for said motor, a driver's seat in the usual relation to the controller, a stand or step for the driver, at the side near the front of the vehicle, steering means accessible to the driver either from the seat or from the side step, and a brake operable by the driver either from the usual seat or from the stand or step, substantially as described.

9. In a peddling automobile, the combination of a motor mounted thereon, a controller for said motor, a driver's seat in the usual relation to the controller, a stand or step for the driver, at the side near the front of the vehicle, steering means accessible to the driver either from the seat or side step, and a brake, said controller and brake being operable from the usual seat and also from the step or stand, substantially as described.

In testimony whereof, I affix my signature in presence of two witnesses.

MELVIN B. CHURCH.

Witnesses:
 WALTER DONALDSON,
 BENNETT S. JONES.